United States Patent
Suhara

(10) Patent No.: US 7,107,744 B2
(45) Date of Patent: Sep. 19, 2006

(54) RUNNING MOWER

(75) Inventor: Yasuyuki Suhara, Osaka (JP)

(73) Assignee: Yanmar Agricultural Equipment Co., Ltd., Osaka (JP)

( * ) Notice: Subject to any disclaimer, the term of this patent is extended or adjusted under 35 U.S.C. 154(b) by 223 days.

(21) Appl. No.: 10/497,726

(22) PCT Filed: Mar. 12, 2003

(86) PCT No.: PCT/JP03/02955

§ 371 (c)(1),
(2), (4) Date: Jun. 4, 2004

(87) PCT Pub. No.: WO2004/026020

PCT Pub. Date: Apr. 1, 2004

(65) Prior Publication Data

US 2004/0261390 A1   Dec. 30, 2004

(30) Foreign Application Priority Data

Sep. 19, 2002 (JP) ............................. 2002-273426

(51) Int. Cl.
A01D 69/00 (2006.01)
(52) U.S. Cl. ............................. 56/11.4; 56/6
(58) Field of Classification Search .................. 56/6, 56/10.8, 11.4, DIG. 6, DIG. 22
See application file for complete search history.

(56) References Cited

U.S. PATENT DOCUMENTS 6,038,840 A * 3/2000 Ishimori et al. ............. 56/13.3
6,109,010 A * 8/2000 Heal et al. ................... 56/10.8
6,360,517 B1   3/2002 Ishimori et al.
6,625,966 B1 * 9/2003 Kaneyuki et al. ............ 56/14.7
6,688,091 B1 * 2/2004 Ishimori ....................... 56/202

FOREIGN PATENT DOCUMENTS

| JP | 7-213136 | 8/1995 |
| JP | 9-9757 | 1/1997 |
| JP | 9-51709 | 2/1997 |
| JP | 9-121661 | 5/1997 |
| JP | 9-272350 | 10/1997 |
| JP | 11-206219 | 8/1999 |

* cited by examiner

Primary Examiner—Meredith C. Petravick
(74) Attorney, Agent, or Firm—Hamre, Schumann, Mueller & Larson, P.C.

(57) ABSTRACT

A running mower of the present invention comprises a traveling body 1 provided, between the front wheels 2 and the rear wheels 3, with a rotary mowing unit 12 which includes a laterally spaced pair of mowing blades 16a, 16b. The traveling body is also provided with an outlet duct 26 extending backward from between the mowing blades past a position between the rear wheels for discharging grass mown by the mowing blades. The rotary mowing unit 12 is provided with a forwardly extending mower input shaft 22 disposed offset from the center of the mowing blades toward one mowing blade 16b by an appropriate amount L1. A front part of the traveling body 1 is provided with an engine 4 whose power is transmitted to the input shaft via a mower transmission shaft 23 having a respective end provided with a universal joint 23a, 23b. As a result, the power transmission from the engine to the rotary mowing unit is simplified while the mown grass is disposed smoothly from the outlet duct 26.

11 Claims, 13 Drawing Sheets

RUNNING MOWER

BACKGROUND OF THE INVENTION

1. Field of the Invention

The present invention relates to a running mower comprising a vertically movable rotary mowing unit that includes a laterally spaced pair of rotary mowing blades.

2. Description of the Related Art

Conventionally, this kind of running mower includes a traveling body supported by front wheels and rear wheels. The traveling body is provided, between the front wheels and the rear wheels, with a vertically movable rotary mowing unit that includes rotary mowing blades (Refer to JP A 9-09757).

The rotary mowing unit of the conventional running mower includes three rotary mowing blades disposed in a substantially triangular arrangement. The rotary mowing blades rotate in the same direction to mow grass that is thrown sideward from the rotary mowing unit. This structure makes the mower considerably large.

Recently, a rotary mowing unit is known which includes a laterally spaced pair of mowing blades that rotate inwardly toward each other in the moving direction of the traveling body. The mowing blades mow grass and discharge the mown grass through an outlet duct extending backward between the mowing blades from the upside of a housing covering the mowing blades.

However, according to the above structure, the height of the outlet duct extending backward from the upside of the housing of the rotary mowing unit cannot be increased between the mowing blades due to obstruction by a transmission shaft connecting an engine to the rotary mowing unit. Thus, there is a problem that mown grass is not smoothly guided into the outlet duct, whereby the mown grass may clog up the housing and the outlet duct.

Due to the outlet duct extending backward from the rotary mowing unit between the rear wheels, the running transmission for the rear wheels should be disposed above the outlet duct. The running transmission needs to be disposed at a raised position for providing a predetermined height of the outlet duct. Thus, the power transmission shaft for transmitting power from the engine at the front part of the traveling body to the running transmission protrudes from the floor between the steering wheel and the operator seat of the traveling body as much as the running transmission is raised, consequently posing an obstacle for the operator in getting on and off the traveling body.

A technical object of the present invention is to provide a running mower which solves the above-described problems.

DISCLOSURE OF THE INVENTION

According to a first aspect of the present invention, a running mower comprises a traveling body provided with an engine at the front part and supported by a pair of front wheels and a pair of rear wheels; a rotary mowing unit attached to the traveling body between the front wheels and the rear wheels, the mowing unit having a laterally spaced pair of mowing blades oppositely rotating about substantially vertical axes, the mowing unit also including a housing covering the mowing blades; and an outlet duct extending backward from upside of the housing between the mowing blades past a position between the rear wheels for discharging grass mown by the mowing blades. A mower input shaft is disposed offset from a center between the mowing blades toward one of the mowing blade to extend forwardly on above the housing for the rotary mowing unit. Engine power is transmitted to the mower input shaft via a mower transmission shaft having a respective end provided with a universal joint.

With the above-described structure, the power of the engine can be transmitted to the rotary mowing unit by a simple mechanism which includes a single transmission shaft having a respective end provided with a universal joint, whereas the height of the outlet duct extending backward from the upside of the housing of the rotary mowing unit can be increased between the mowing blades, without being obstructed by the running transmission shaft and the running input shaft. As a result, mown grass is smoothly guided into the outlet duct, whereby the mown grass scarcely clogs up the housing and the outlet duct.

According to a second aspect of the present invention, a running mower comprises a traveling body provided with an engine at the front part and supported by a pair of front wheels and a pair of rear wheels; a rotary mowing unit attached to the traveling body between the front wheels and the rear wheels, the mowing unit having a laterally spaced pair of mowing blades oppositely rotating about substantially vertical axes, the mowing unit also including a housing covering the mowing blades; and an outlet duct extending backward from upside of the housing between the mowing blades past a position between the rear wheels for discharging grass. mown by the mowing blades. A mower input shaft is disposed offset from a center between the mowing blades toward one of the mowing blade to extend forwardly on above the housing for the rotary mowing unit. Engine power is transmitted to the mower input shaft via a mower transmission shaft having a respective end provided with a universal joint. Upside of the outlet duct is provided with a running transmission for the rear wheels. A running intermediate shaft extends upwardly disposed in front of and adjacent to the running transmission. The engine power is transmitted to a lower of the running intermediate shaft via a running transmission shaft extending substantially horizontally backward from an output shaft of the engine. Further, the engine power is transmitted from an upper end of the intermediate shaft to an input shaft of the running transmission.

The above-described structure also provides the advantages of the first aspect. Further, though the engine power of the engine is transmitted to the running transmission via the single running transmission shaft, the running transmission shaft can be lowered by an amount corresponding to the vertical height of the running intermediate shaft while the running transmission is raised to provide a predetermined height for the outlet duct. As a result, the running transmission shaft is arranged not to protrude too much from the floor between the steering wheel and the operator seat of the traveling body where the operator gets on and off. In other words, the protruding height of the running transmission shaft from the floor is kept low.

Thus, the operator can easily get on and off the traveling body while the power transmission from the engine at the front part to the transmission at the rear part can be simplified, and the mown grass can be smoothly discharged rearwardly.

In either the first or second aspect, the mower input shaft may be inclined forwardly inward in plan view. With such a structure, the bending angle of the universal joint at each end of the mower transmission shaft can be rendered smaller than if the input shaft is not inclined inward, thereby reducing power loss at the universal joint while improving the durability.

In either the first or second aspect, the universal joint at the front end of the mower transmission shaft may be positioned offset toward the input shaft in plan view. As a result, the bending angle of the universal joint at each end of the mower transmission shaft can be rendered even smaller than otherwise.

In either the first or second aspect, the running intermediate shaft may be positioned laterally offset from the output shaft of the engine in plan view, and the running transmission shaft which connects the running intermediate shaft and the output shaft is inclined backwardly outward in plan view. With this structure, the running transmission shaft does not interfere with the steering wheel shaft which is located substantially at the center of the traveling body in plan view. Further, the steering box of the steering wheel can be positioned below the running transmission shaft, thereby increasing the floor area around the operator's feet on the traveling body.

Further, in either the first or second aspect, the traveling body may be provided with an operator seat which has a rear portion provided with a seat switch mechanism that stops the engine or interrupts the power transmission from the engine to the rear wheels and/or to the rotary mowing unit when the operator gets off the operator seat. This structure is advantageous in that the height of the seat switch mechanism is not added to the height of the seat from the traveling body. As a result, the height of the seat is lower than if the seat switch mechanism is arranged under the operator seat.

Particularly, the running transmission may have a pair of end portions fixed to a laterally spaced pair of side frames that form part of the traveling body. Due to this structure, the side frames can be interconnected to each other by the running transmission. In other words, the running transmission can be used as a member to interconnect the side frames, thereby contributing to structure simplification and weight reduction of the traveling body.

Other objects, features, and advantages will be apparent in the following description of the embodiments with reference to the accompanying drawings.

DETAILED DESCRIPTION OF THE PREFERRED EMBODIMENTS

Figure 1:
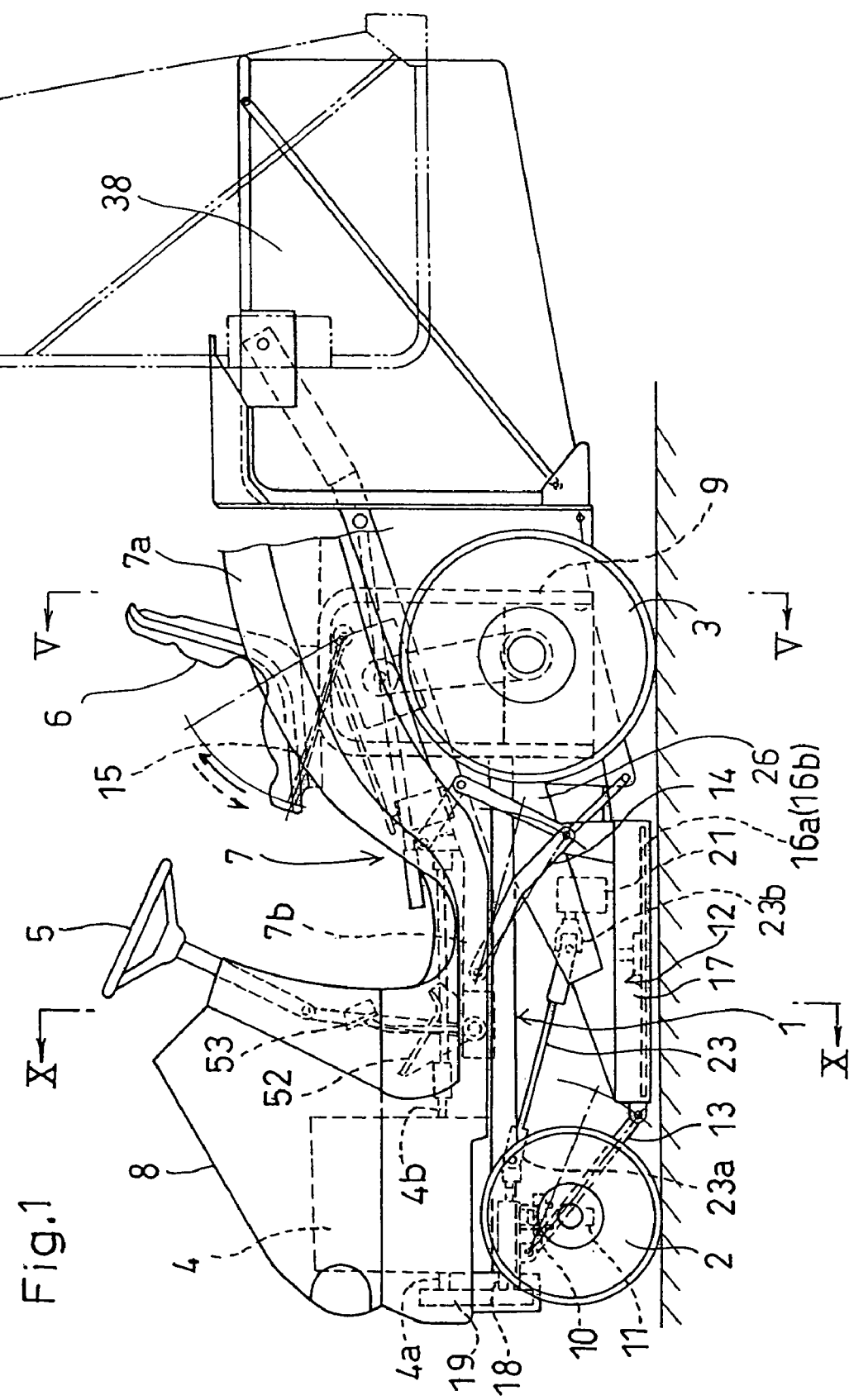
FIG. 1 is a side view of a running mower according to an embodiment of the present invention.
Figure 2:
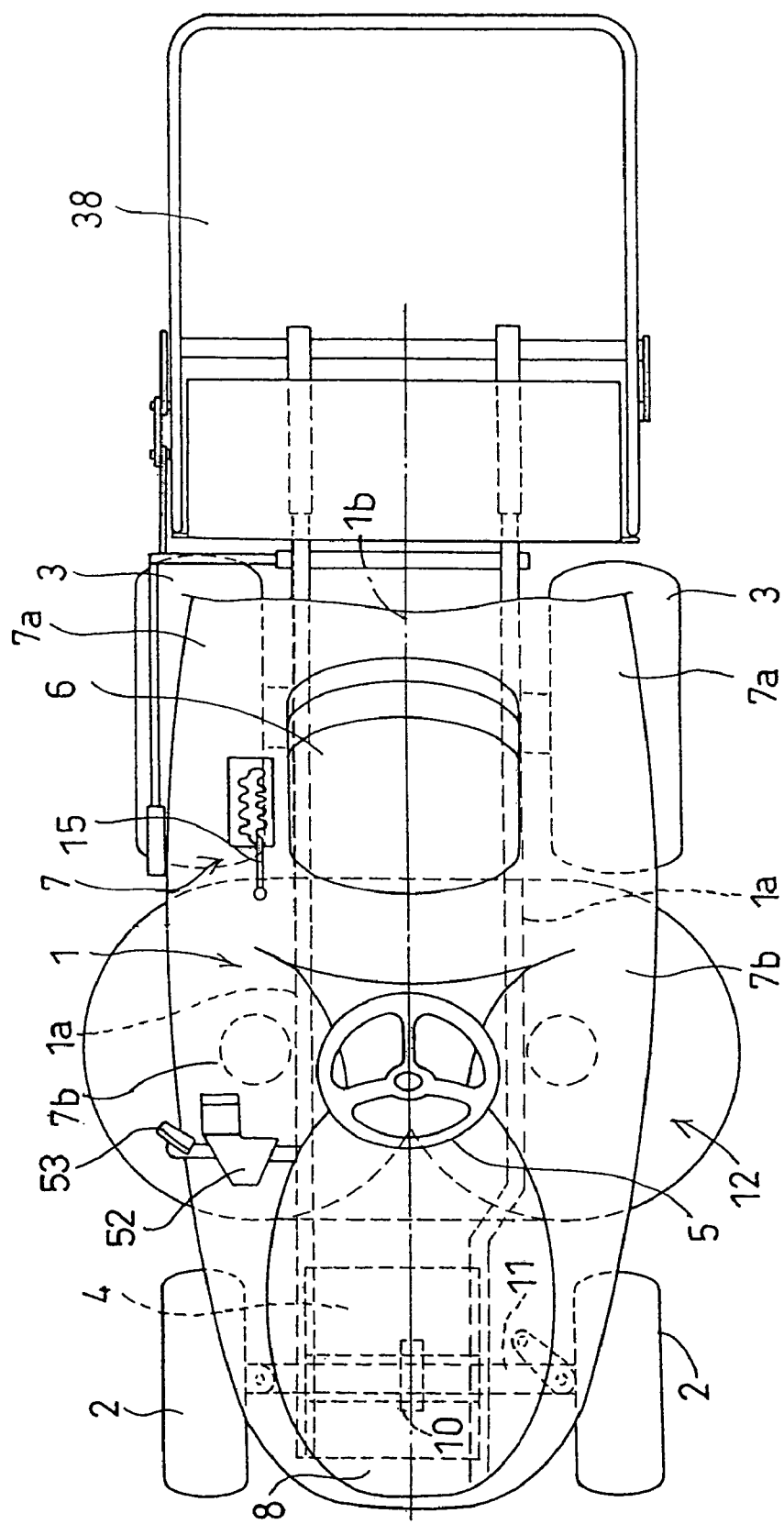
FIG. 2 is a plan view of FIG. 1.
Figure 3:
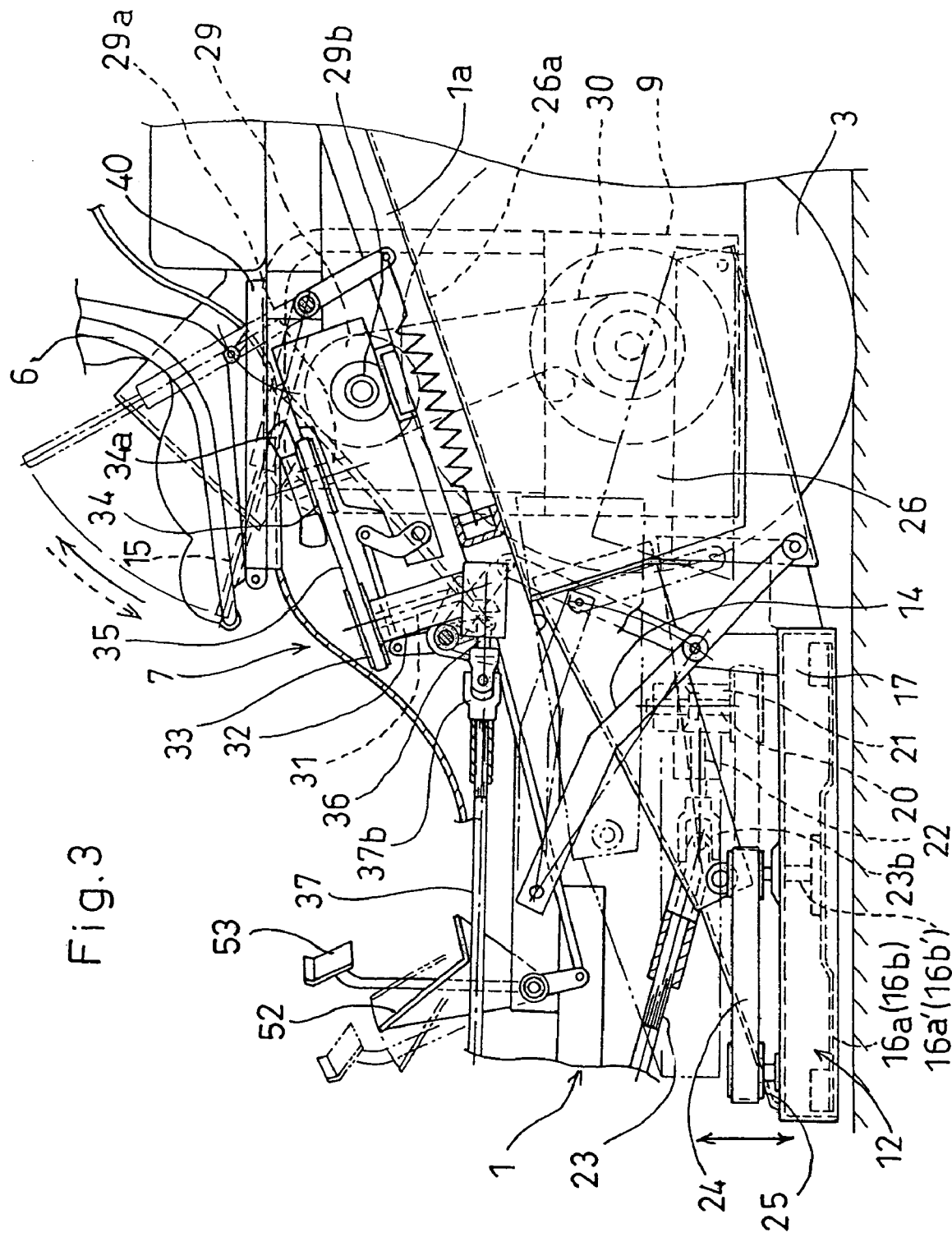
FIG. 3 is an enlarged view showing a principal part of FIG. 1.

Preferred embodiments of the present invention are described below with reference to the accompanying drawings.

In the drawings, reference number 1 represents a traveling body.

The traveling body 1 comprises a laterally spaced pair of side frames 1a extending lengthwise of the traveling body in parallel to each other. The traveling body is supported by a laterally spaced pair of front wheels 2 disposed outwardly from a front part of the side frames 1a as well as by a laterally spaced pair of rear wheels 3 disposed outwardly from a rear part of the side frames 1a. A front part of the traveling body 1 is provided, on its upside, with an engine 4 and a steering wheel 5 for simultaneously pivoting both of the front wheels 2, whereas a rear part of the traveling body 1 is provided, on its upside, with a seat 6 for an operator.

The upside of the traveling body 1A is entirely covered by a cowling 7 which includes a fender 7a for covering both of the rear wheels 3 from above, and a step 7b located in front of the operator seat. The cowling 7 is provided with an openable or removable hood 8 for covering the engine 4.

Brackets 9, each of which is rectangular in side view (FIG. 1), are fixed laterally outwardly to a rear part of the side frames 1a of the traveling body 1 in a vertically extending posture. The brackets 9 support the operator seat 6 at their upper ends and the rear wheels 3 at their lower ends.

On the other hand, the front wheels 2 are pivoted to both ends of a front axle 11 for horizontal pivotal movement. The front axle is pivoted centrally to a center pin 10 for vertical pivotal movement. The center pin is located under a front part of the traveling body 1 on a center line 1b as seen widthwise in plan view. Due to the pivotal movement of the front axle 11 about the center pin 10, the front wheels 2 move in opposite directions. Specifically, when one of the front wheels (e.g. the left front wheel) moves upward, the other front wheel (e.g. the right front wheel) moves downward.

A steering box 5a is disposed on the widthwise center line 1b of the travelling body 1 for simultaneously pivoting both of the front wheels 2 in the same direction. A steering shaft 5b extends upwardly from the steering box 5a and has an upper end for attachment to the steering wheel 5.

Figure 10:
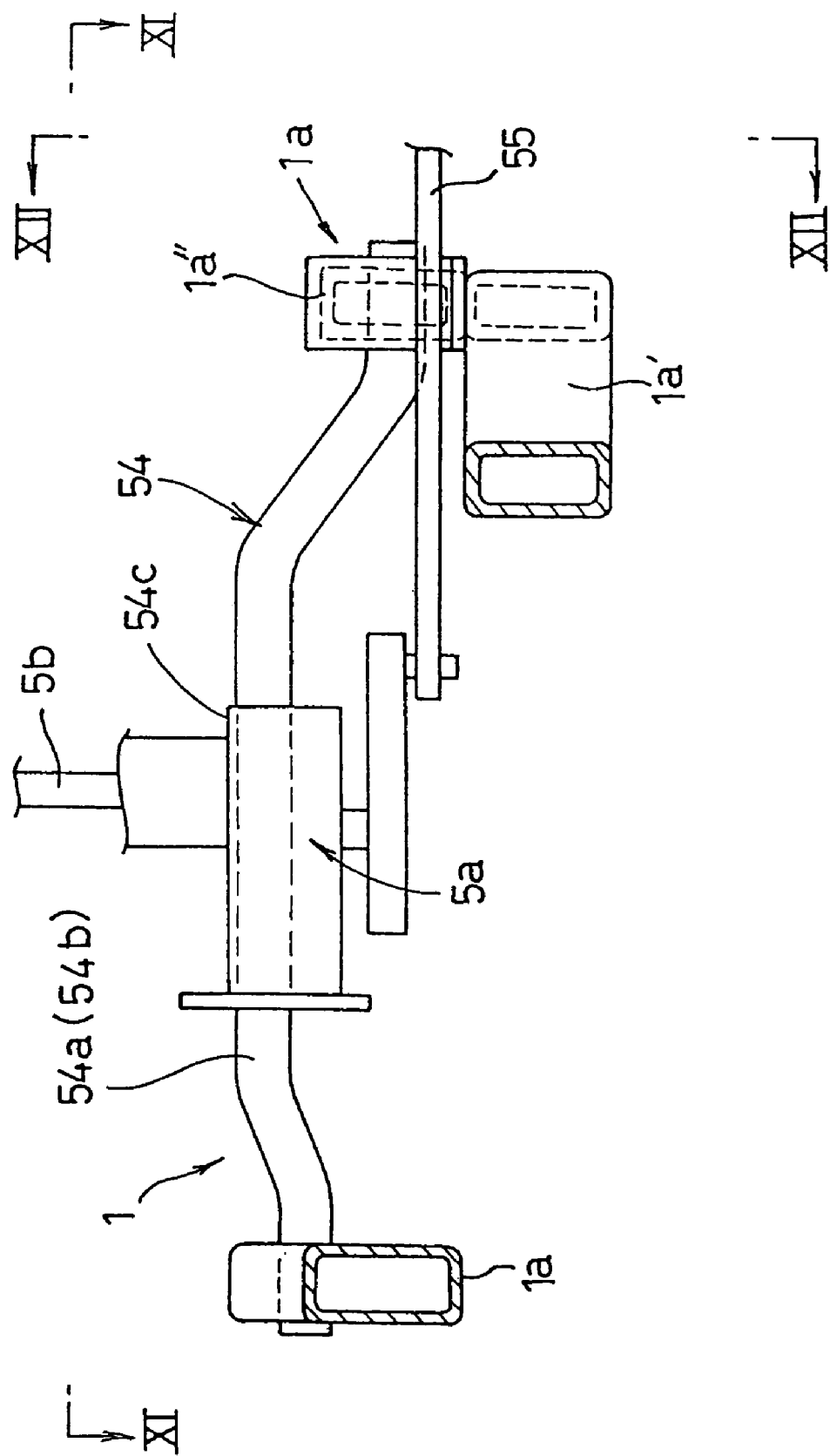
FIG. 10 is an enlarged view taken along lines X—X of FIG. 1.
Figure 11:
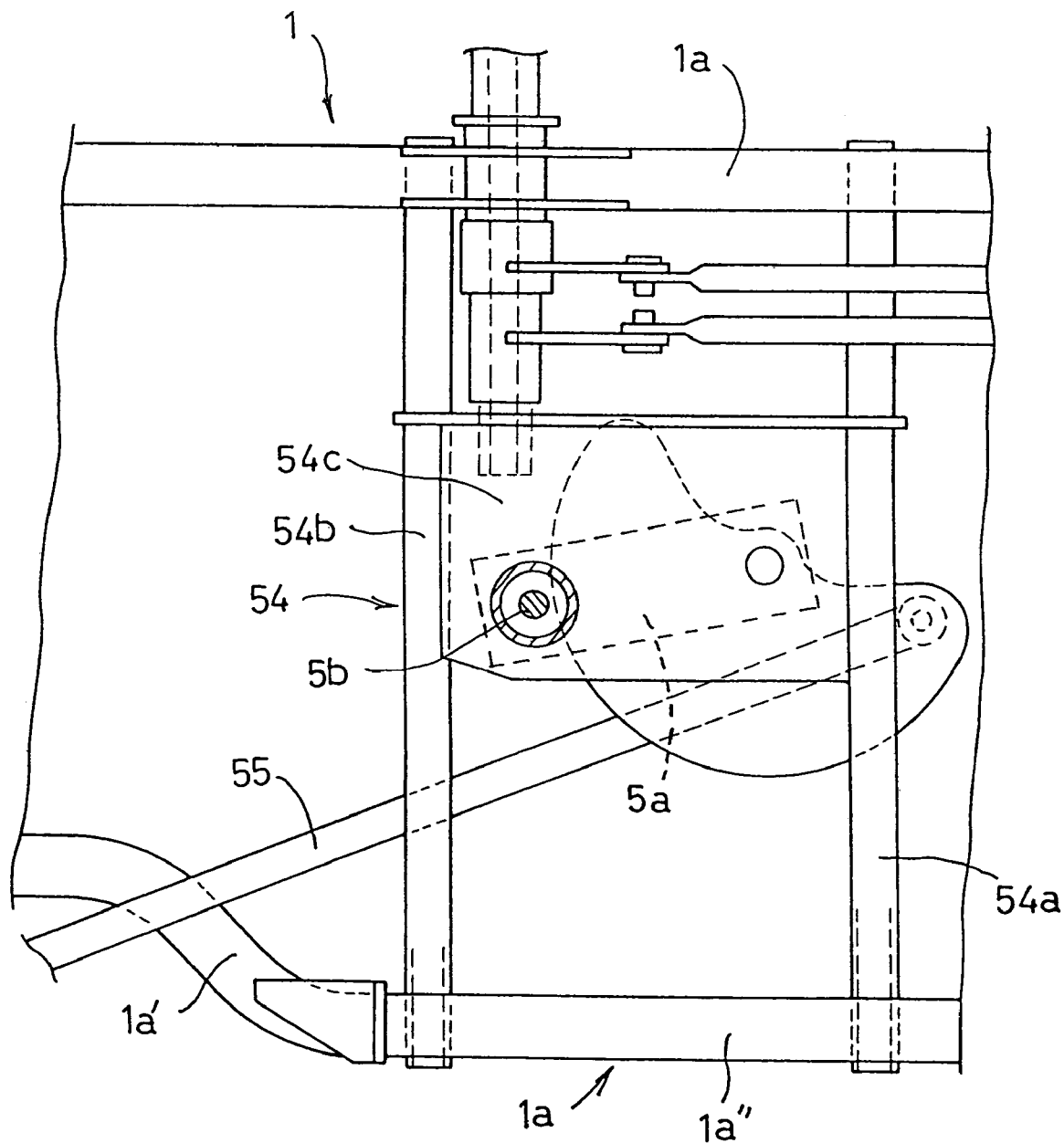
FIG. 11 is a plan view taken along line XI—XI of FIG. 10.
Figure 12:
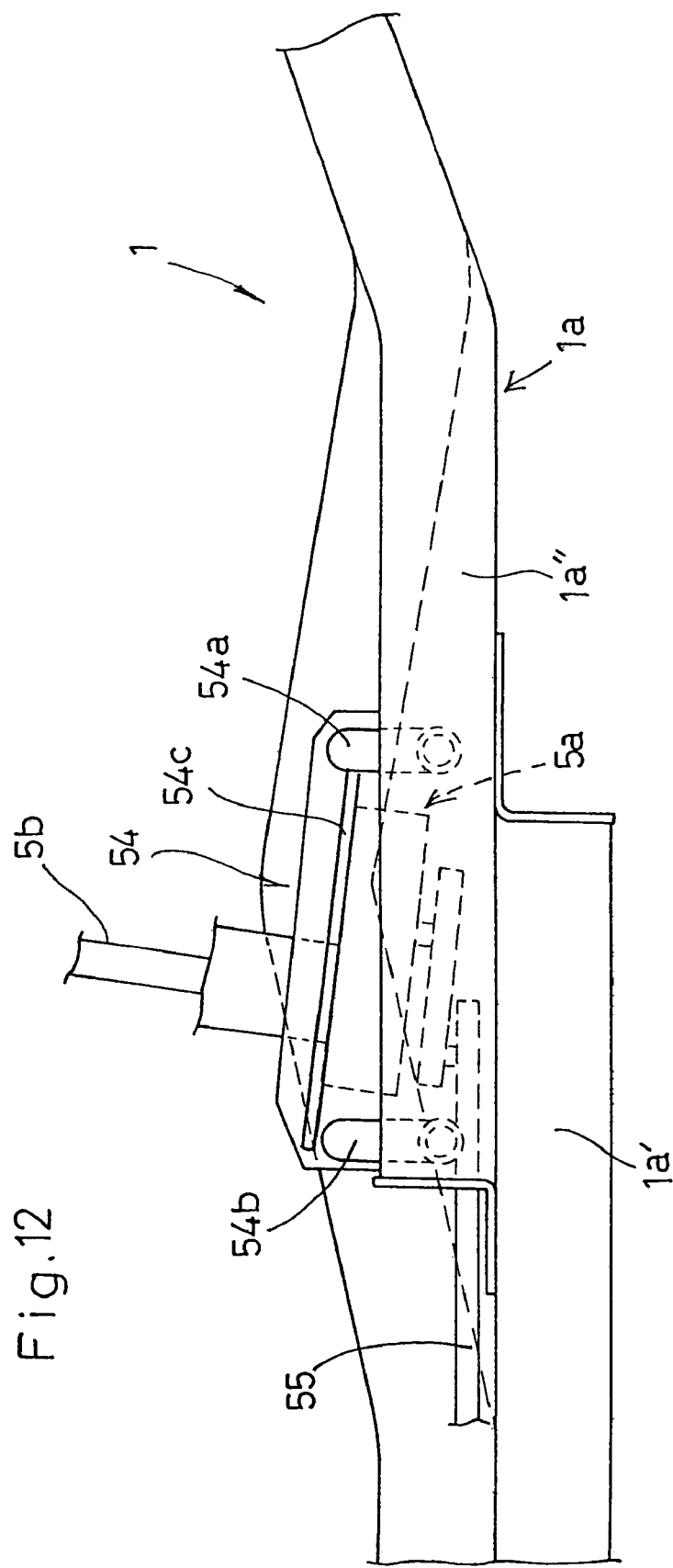
FIG. 12 is a side view taken along line XII—XII of FIG. 10.

As illustrated in FIGS. 10–12, the steering box 5a is mounted on a stay 54 that interconnects the laterally spaced pair of side frames 1a of the travelling body 1. One of the side frames 1a (the left side frame as viewed in the advancing direction) is divided into a front frame member 1a' positioned forwardly from the stay 54, and a rear frame member 1a" positioned rearwardly from the stay. The front frame member 1a' is positioned lower than the rear frame member 1a" and attached thereto by welding for example. A drag rod 55 for connecting the steering box 5a to the above-mentioned one front wheel 2 (the left front wheel) extends above and across the front frame member 1a'.

The stay 54 includes a lengthwise spaced pair of pipes 54a, 54b and a plate 54c mounted between these pipes.

A rotary mowing unit 12 is mounted to the underside of the traveling body 1 between the front wheels 2 and the rear wheels 3 for vertical movement by a laterally spaced pair of front links 13 and a laterally spaced pair of rear links 14. The rotary mowing unit can be moved up and down by pivotally operating an up-down lever 15 disposed at the right side of the operator seat 6. The rotary mowing unit 12 is provided with a laterally spaced pair of mowing blades 16a, 16b each of which rotates about a substantially vertical axis, and a housing 17 for entirely covering the mowing blades 16a, 16b from above.

The mowing blades 16a, 16b of the rotary mowing unit 12 are equally spaced from the center line 1b of the traveling body 1, as seen in plan view.

The engine 4 is provided with output shafts 4a and 4b projecting forward and backward from the engine 4, respectively. The output shaft 4a projecting forward transmits its torque via a belt 19 to an intermediate shaft 18 for the rotary mowing unit. The intermediate shaft is supported at the front part above the center pin 10 and extends lengthwise of the traveling body.

The upside of the housing 17 of the rotary mowing unit 12 is provided with a gear case 21 in which a vertical shaft 20 is rotatably supported. An input shaft 22 is rotatably supported on the gear case 21 for engagement with the vertical shaft 20 via bevel gears inside the gear case, and extends forwardly horizontally from the gear case. An extensible transmission shaft 23 is connected at both ends to the front end of the inputs haft 22 and to the rear end of the intermediate shaft 18 via universal joints 23a, 23b, respectively. The power of the engine 4 is transmitted to the vertical shaft 20 through the intermediate shaft 18, the transmission shaft 23, and the input shaft 22. The rotation of the vertical shaft 20 is then transmitted to the mowing blades 16a, 16b via an endless belt 24 wound around the vertical shaft 20 and shafts 16a', 16b' of the mowing blades 16a, 16b. As a result, the mowing blades rotate inwardly toward each other in the moving direction of the traveling body as indicated by broken line arrows in FIG. 4.

As seen in plan view, the intermediate shaft 18 for the rotary mowing unit is offset from the center line 1b of the traveling body 1 toward the mowing blade 16b by a appropriate amount S. Further, the universal joint 23a at the front end of the transmission shaft 23 for the rotary mowing unit is also offset from the center line 1b of the traveling body 1 toward the mowing blade 16b by a appropriate amount S. On the other hand, the vertical shaft 20 is offset from the center line 1b of the traveling body 1 toward the mowing blade 16b by an appropriate amount L1, so that the vertical shaft 20 is inclined forwardly inward facing in the moving direction of the traveling body at an angle of θ.

The end less belt 24 is wound around plurality of pulleys 25 are mounted at the front part on the upside of the housing 17 for bridging between the mowing blades 16a, 16b, while circumventing the front side of an outlet duct 26 to be described below. The rotary mowing unit 12 is flanked by front grounding casters 27 and rear grounding casters 28.

The outlet duct 26 is provided on the upside of the housing 17 of the rotary mowing unit 12 for disposing grass mown by the mowing blades 16a, 16b of the rotary mowing unit 12. The outlet duct extends backward between the rearwheels 3, or more precisely, between the laterally spaced pair of brackets 9 to which the rear wheels 3 are mounted.

The rear part of the side frames 1a of the traveling body 1 is tilted backwardly upward relative to the horizontal. The outlet duct 26A has a top panel 26a extending backward along the underside of the side frames, tilted backwardly upward.

The rear end of the output duct 26 is connected to a collecting box 38 attached to the rear part of the traveling body 1 to receive mown grass.

The rotation of the engine 4 is transmitted to the rear wheels 3 upon suitable speed reduction via a transmission 29 which is provided above the outlet duct 26 and below the operator seat 6. The transmission 29 is provided with an upstanding input shaft 29a projecting upward, and output shafts 29b projecting laterally from both sides of the transmission 29 into the brackets 9. The brackets 9 are internally provided with endless chains 30 for transmitting the rotation of the output shafts 29b to the rear wheels 3, thereby driving the rear wheels 3.

Both ends of the transmission 29 are fixed, by bolting for example, to the side frames 1a of the traveling body 1, whereby the side frames 1a are interconnected to each other by the transmission 29.

In front of and adjacent the transmission 29, an upwardly extending intermediate shaft 31 is rotatably supported in a gear case 32 attached to the traveling body 1. The upper end of the intermediate shaft 31 is fitted with a pulley 33 in winding engagement with an endless belt 35 which in turn is held in winding engagement with a pulley 34 fitted on the input shaft 29a of the transmission 29. An endless belt 35 is wound around the pulley 33 and the pulley 34. The underside of the gear case 32 supporting the intermediate shaft 31 is provided with a horizontal shaft 36 that projects forward in engagement with the intermediate shaft 31 via bevel gears inside the gear case. The horizontal shaft 36 is connected to the output shaft 4b extending backward from the engine 4, by means of an extensible transmission shaft 37 having universal joints 37a, 37b at both ends. The power of the engine 4 is transmitted to the transmission 29 through the transmission shaft 37, the horizontal shaft 36, the intermediate shaft 31, and the endless belt 35.

Figure 4:
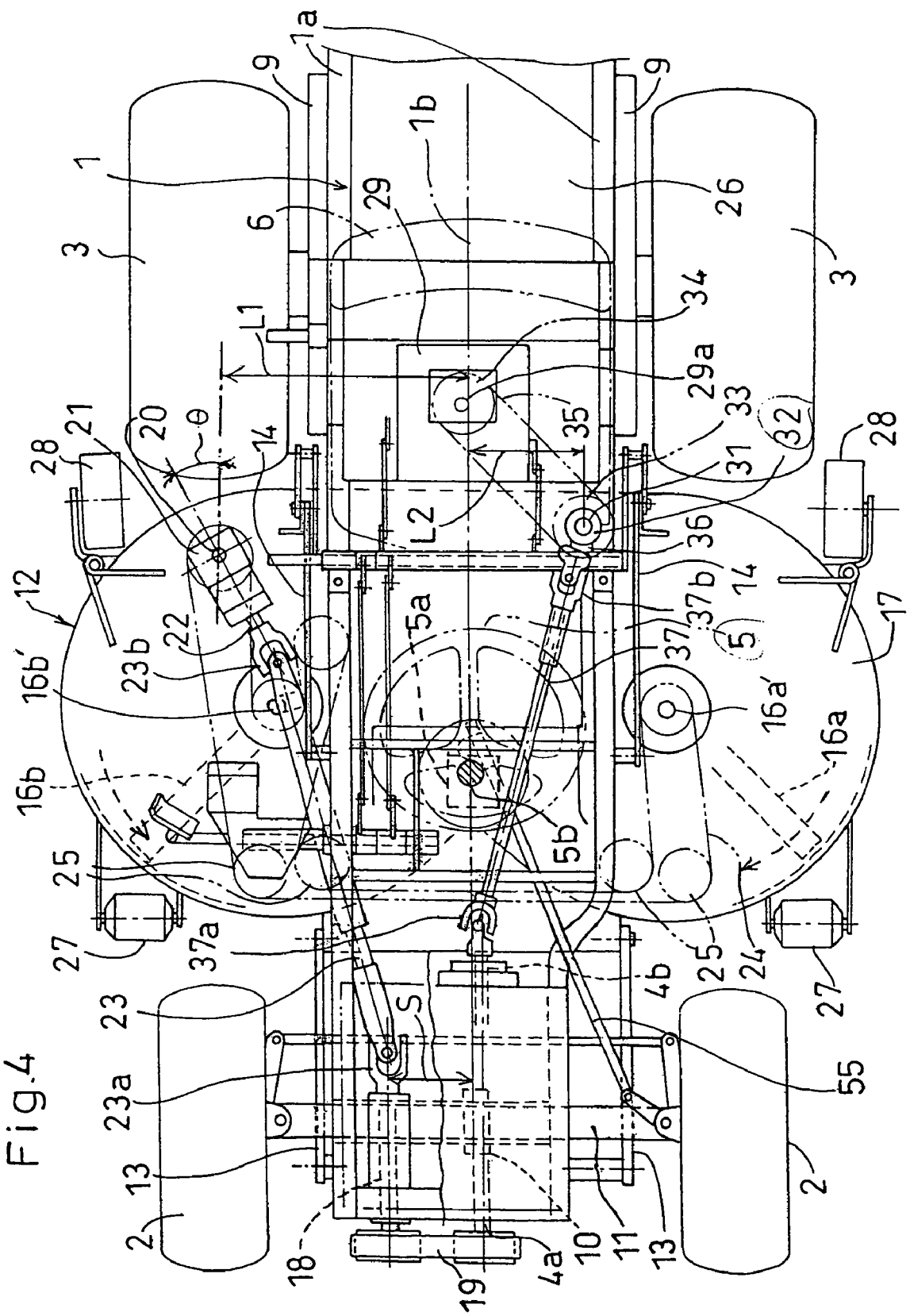
FIG. 4 is a plan view of FIG. 3.
Figure 5:
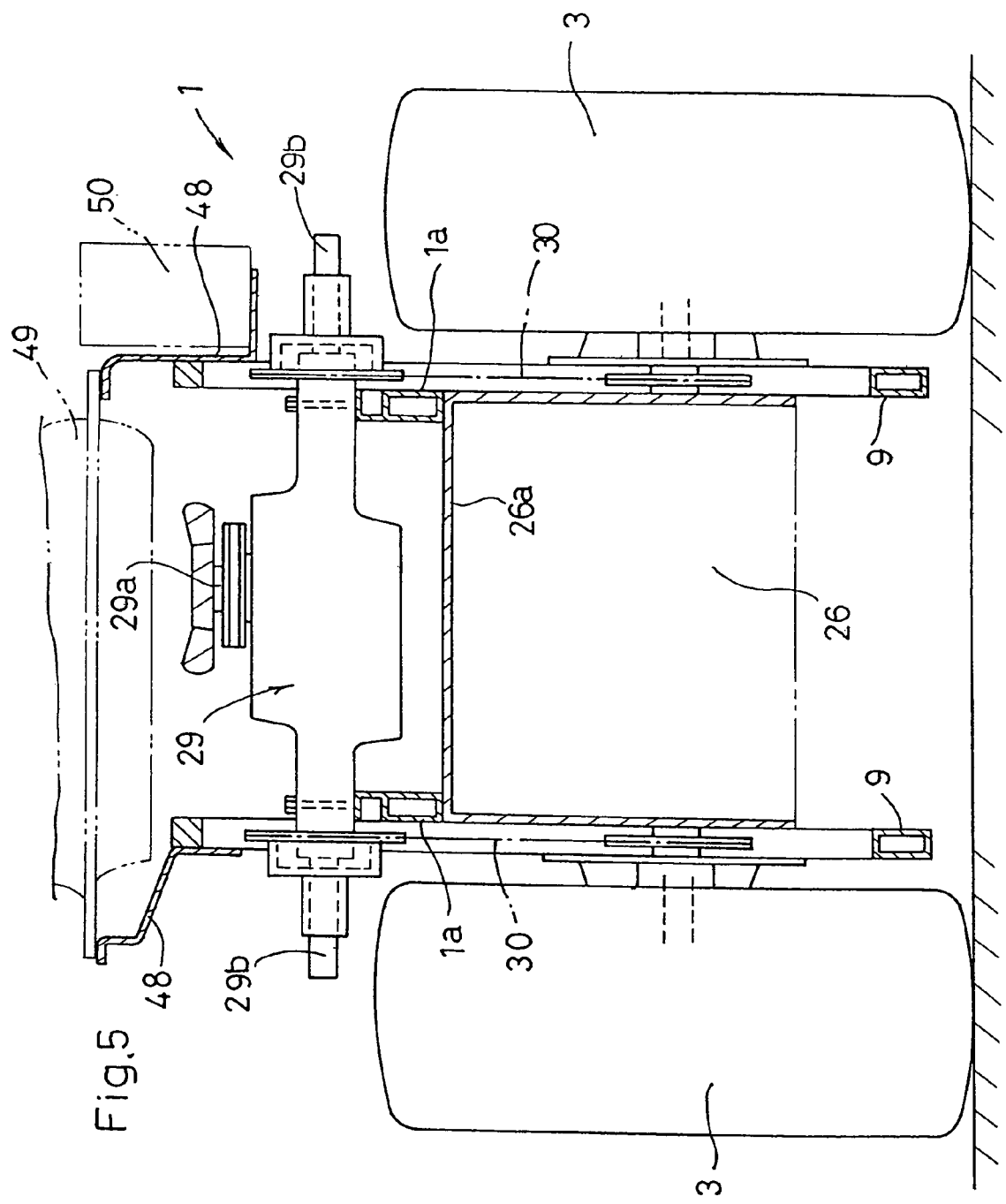
FIG. 5 is an enlarged view taken along lines V—V of FIG. 1.
Figure 6:
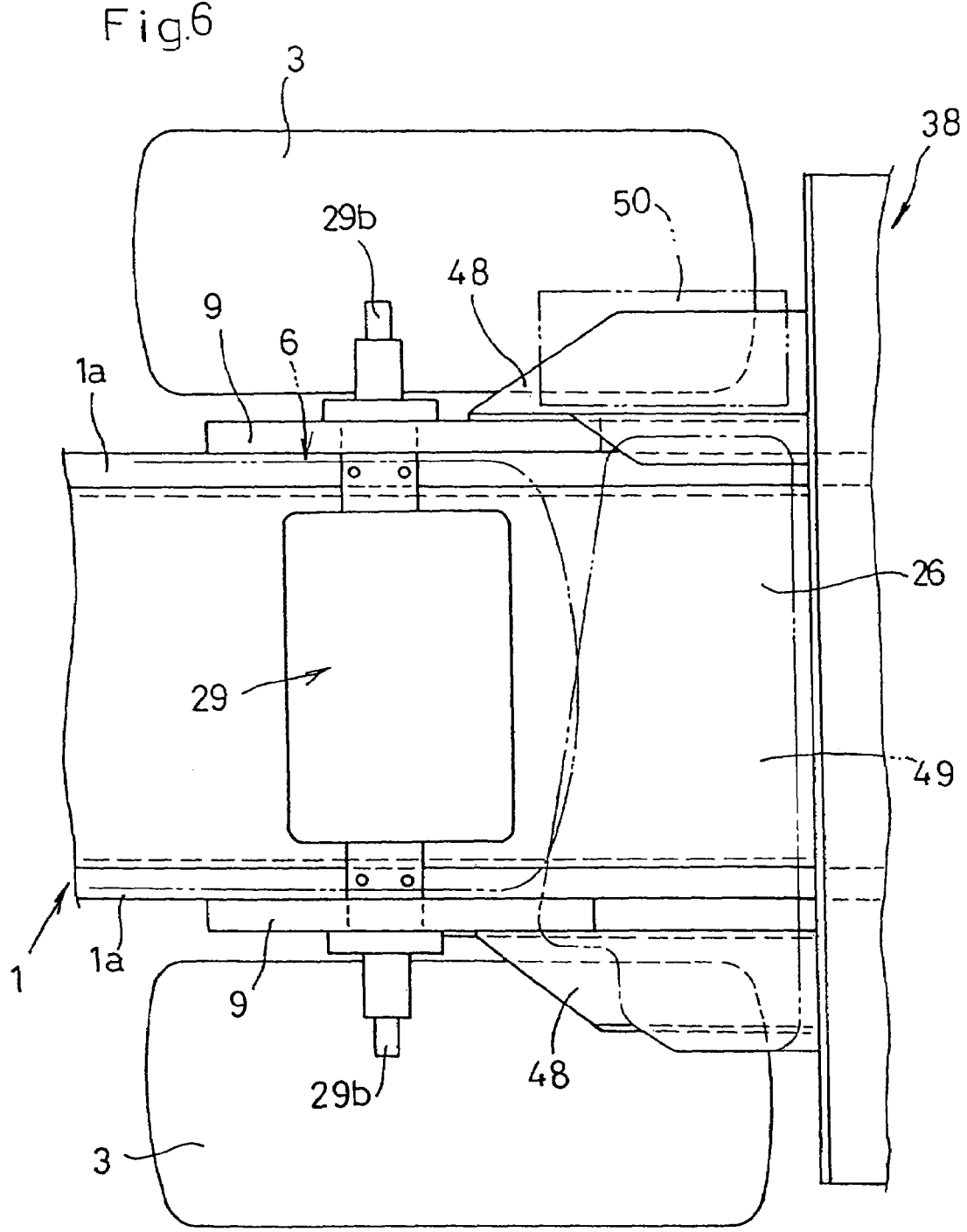
FIG. 6 is a plan view of FIG. 5.
Figure 7:
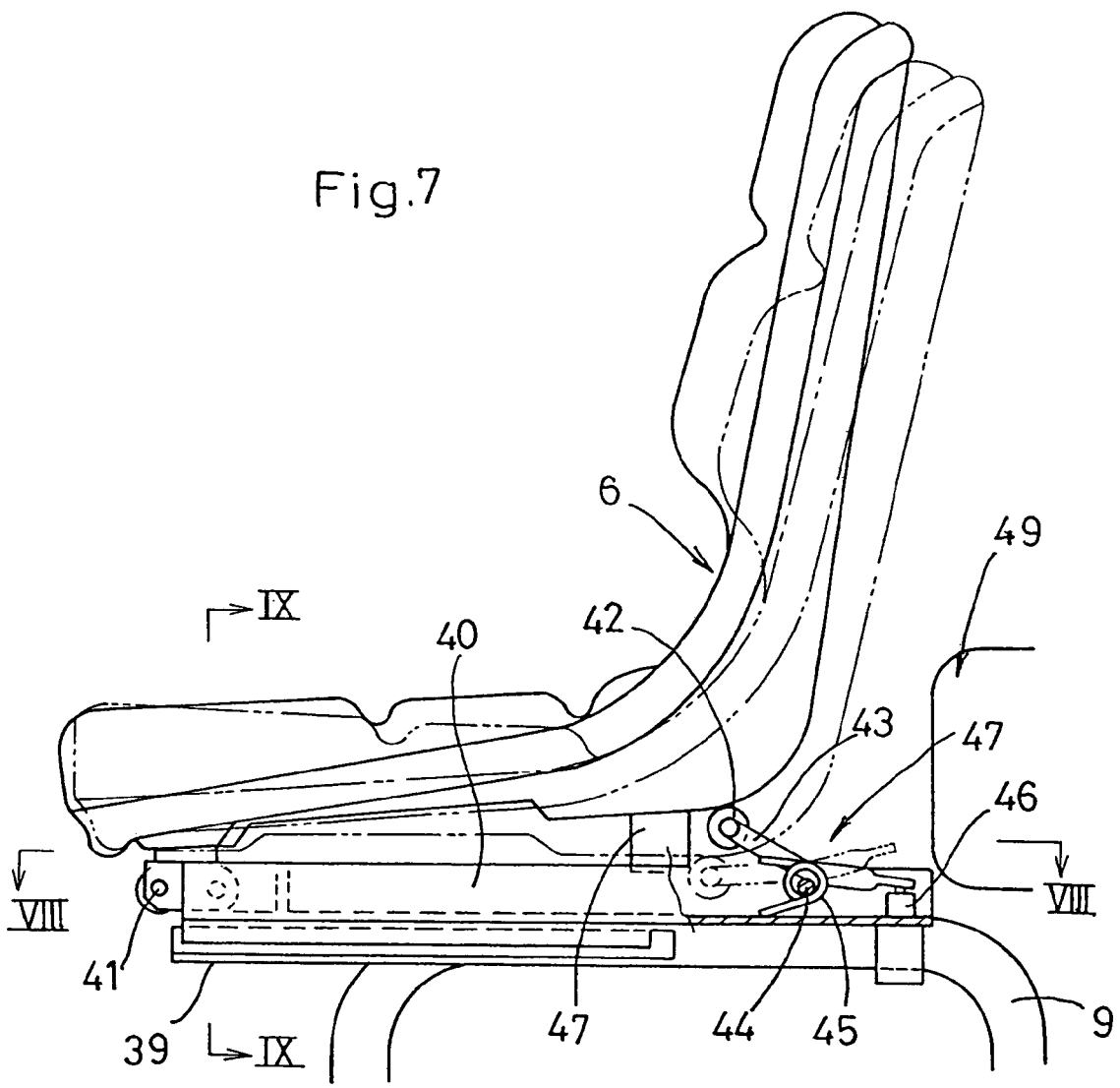
FIG. 7 is a view showing the structure of an operator seat.
Figure 8:
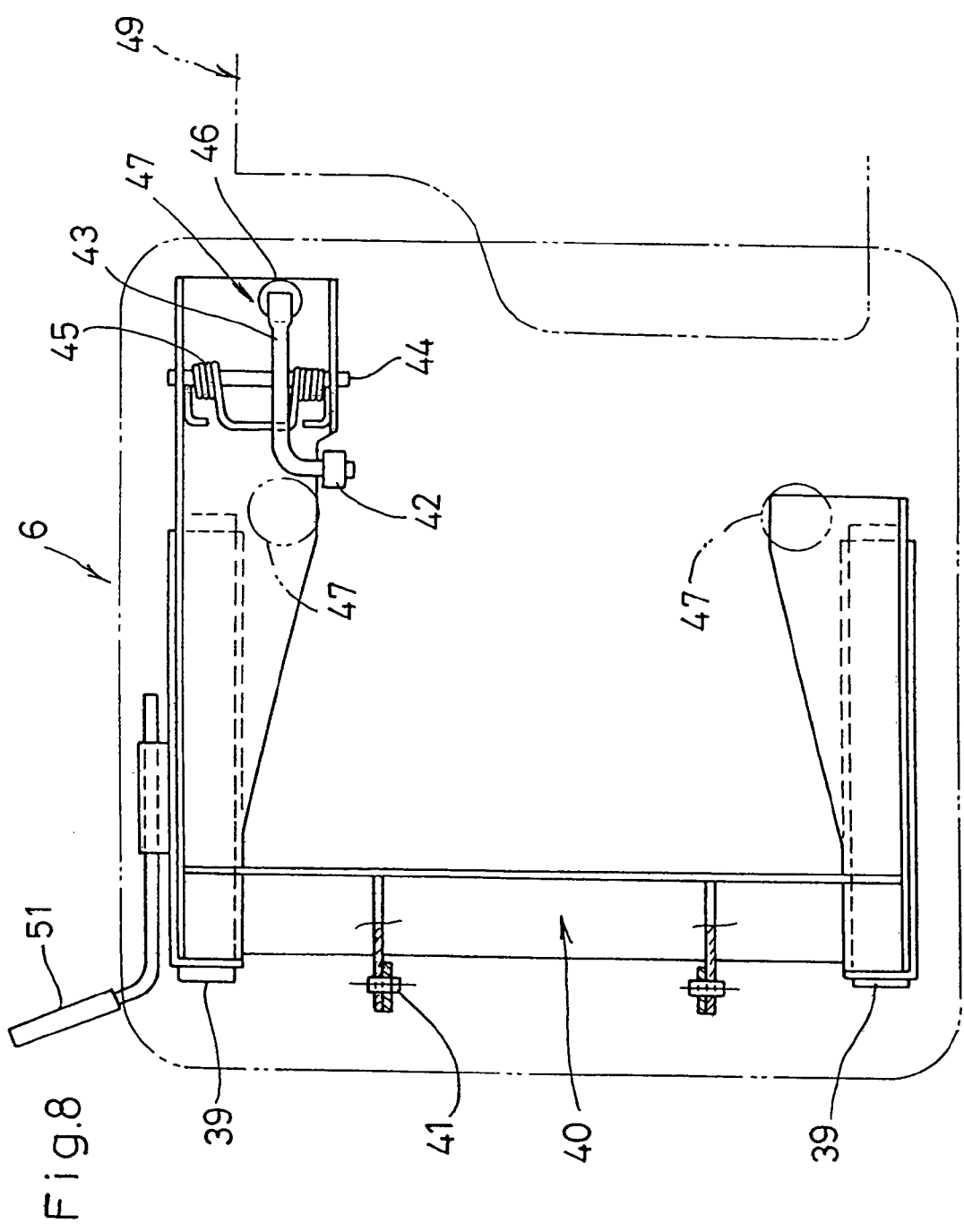
FIG. 8 is a plan view taken along lines VIII—VIII of FIG. 7.
Figure 9:
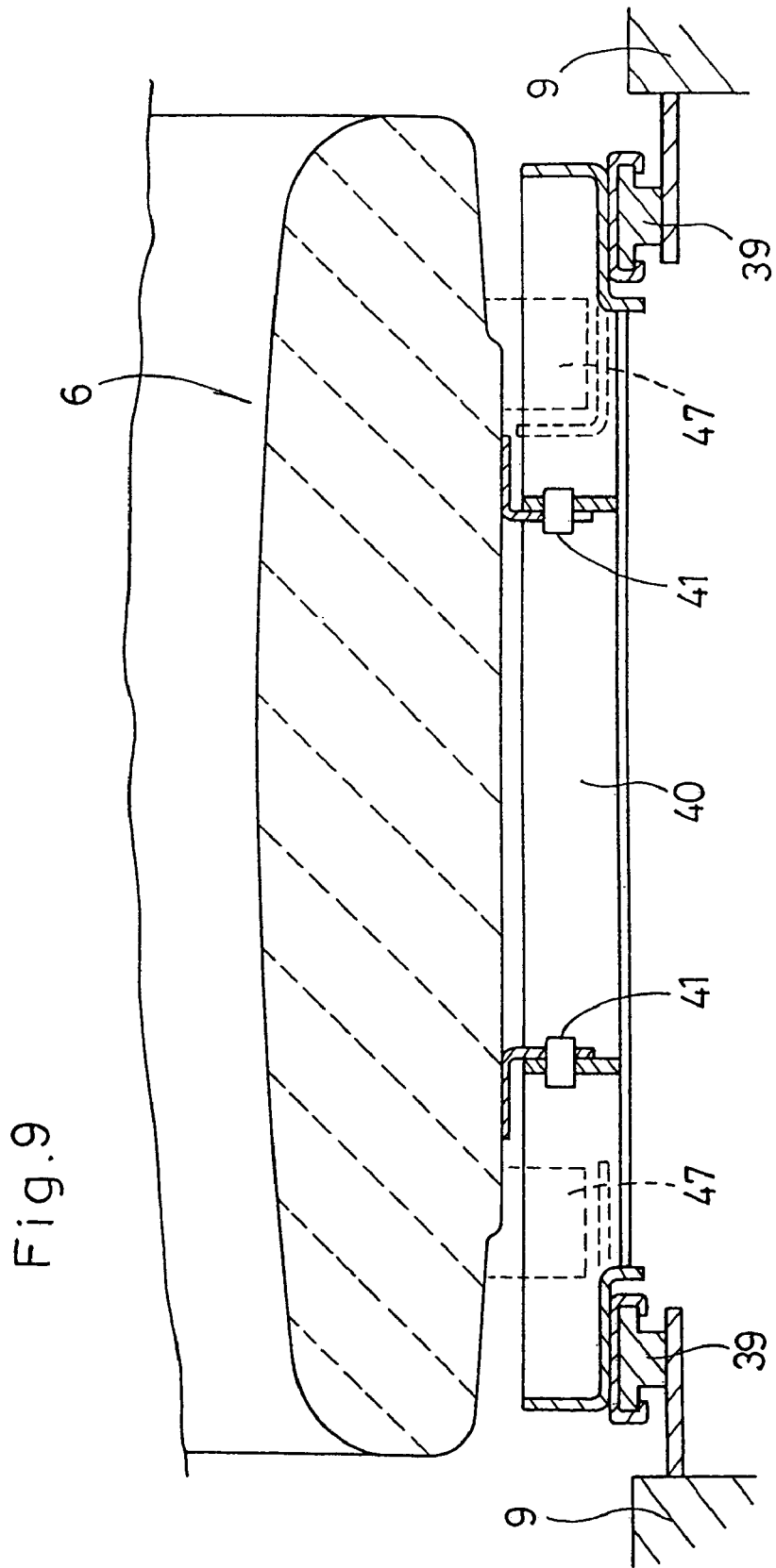
FIG. 9 is an enlarged view taken along lines IX—IX of FIG. 7.

As illustrated in plan view of FIG. 4, the gear case 32 supporting the intermediate shaft 31 is laterally offset from the center line 1b of the traveling body 1 by an appropriate amount L2. As a result, the extensible transmission shaft 37 is tilted backwardly outward so that the steering wheel shaft 5b extends across the extensible transmission shaft 37 with the steering box 5a positioned below the extensible transmission shaft 37.

The input shaft 29a of the transmission 29 has an upper end provided with a blower 34a for sucking the air around the operator seat 6 to create a downward current of air.

The pulley 33 at the upper end of the intermediate shaft 31 may also drive another blower for assisting the blower 34a in generating a downward current of air.

The upper part of the brackets 9 with the rear wheels 3 are provided with a laterally spaced pair of rails 39 extending lengthwise of the traveling body. The rails 39 support a seat supporting bracket 40 movably in the lengthwise direction of the traveling body. The operator seat 6 is pivotally supported at its front end to the front end of the seat supporting bracket 40 by means of a pin 41. Thus, the operator seat 6 is adjustable lengthwise of the traveling body, while also being upwardly pivotable. The seat supporting bracket 40 has a rear part pivotally supporting a lever 43 by a pin 44 behind the operator seat 6. The lever carries a roller 42 that abuts the underside of the rear part of the operator seat 6. The lever 43 is biased by a torsion spring 45 wound around the pin 44, for pivotally lifting the operator seat 6. The seat supporting bracket 40 is provided with an on-off switch 46 for operation by pivoting of the lever 43. When an operator sits down on the operator seat 6, a cushion 47 behind the operator seat 6 is pressed against the torsion spring 45 until it abuts on the seat supporting bracket 40, thereby turning on the switch 46 to start the engine 4 or to transmit the power from the engine 4 to the rear wheels 3 and the rotary mowing unit 12. When the operator gets off the operator seat 6, the rear part of the operator seat 6 is raised up from the seat supporting bracket 40 biased by the torsion spring 45, thereby turning off the switch 46 to stop the engine 4 or to interrupt the power transmission from the engine 4 to the rear wheels 3 and the rotary mowing unit 12.

As described above, the lever 43, the torsion spring 45, and the switch 46a provide a seat switch mechanism 47 to stop the engine 4 or to interrupt the power transmission from the engine 4 to both or one of the rear wheels 3 and the rotary mowing unit 12, when the operator gets off the operator seat 6.

The upside of the brackets 9 is fixed to bracket plates 48 behind the operator seat 6. The bracket plates 48 are attached to a fuel tank 49 bridging there between, and a battery 50 is mounted on one of the bracket plates 48. The seat supporting bracket 40 is provided with an operating handle 51 for adjustably fixing the operator seat 6 at a desired position lengthwise of the traveling body.

The right side of an intermediate part on the upside of the traveling body 1 is provided with a speed change pedal 52 and a brake pedal 53 for operating the transmission 29.

With the above-described structure, while the traveling body 1 moves forward, the rotary mowing unit 12 rotates to mow lawn as desired. The mown grass is thrown rearwardly through the outlet duct 26 to the outside or into the collecting box 38 arranged removably at the rear end of the outlet duct 26.

As described above, the input shaft 22 for the rotary mowing unit 12 is arranged on the upside of the housing 17 of the rotary mowing unit 12, offset from the center between the mowing blades 16a, 16b or from the center line 1b of the traveling body 1 toward the mowing blade 16b by an appropriate amount L1. The power of the engine 4 is transmitted to the input shaft 22 via the transmission shaft 23 provided with the universal joints 23a, 23b at both ends. As a result, the single transmission shaft 23 provided with the universal shaft joints at both ends reliably transmits the power from the engine 4 to the rotary mowing unit. Additionally, the height of the outlet duct 26 extending backward from the upside of the housing 17 on the rotary mowing unit 12 can be increased between the mowing blades 16a and. 16b, without being obstructed by the transmission shaft 23 and the input shaft 22.

The power of the engine 4 is first transmitted to the intermediate shaft 18 via the belt 19. The intermediate shaft 18 extends backward, and the transmission shaft 23 provided with the universal joints 23a, 23b at both ends connects the intermediate shaft 18 to the input shaft 22. The input shaft 22 is tilted forwardly inward at an angle of θ as seen in plan view. Due to this structure, the tilting angle of the universal joint 23a at one end of the transmission shaft 23 relative to the intermediate shaft 18 as well as the tilting angle of the universal joint 23b at the other end of the transmission shaft 23 relative to the input shaft 22 can be rendered smaller than if the input shaft 22 is. not tilted inward but parallel or substantially is parallel to the center line 1b of the traveling body 1.

Further, the tilting angle of the universal joint 23a at one end of the transmission shaft 23 relative to the intermediate shaft 18 as well as the tilting angle of the universal joint 23b at other end of the transmission shaft 23 relative to the input shaft 22 can be additionally decreased by disposing the intermediate shaft 18 offset from the center between the mowing blades 16a and 16b on upside of the housing 17 of the rotary mowing unit 12 or from the center line 1 of the traveling body 1 toward the mowing blade 16b by an appropriate amount S, as seen in plan view.

The intermediate shaft 31 is disposed to extend upwardly adjacent the front side of the transmission 29. The intermediate shaft 31 receives, at its bottom end, the power from the engine 4 via the transmission shaft 37 that extends substantially horizontally backward from the output shaft 4b, where as the input shaft 29a of the transmission 29 receives the power from the upper end of the intermediate shaft 31. In this way, though the power of the engine 4 to the transmission 29 is transmitted via the single transmission shaft 37, the height of the transmission shaft 37 can be lowered by an amount corresponding to the height of the intermediate shaft 31 while the transmission 29 is disposed at a high position to arrange the outlet duct 26 at a predetermined height. As a result, the transmission shaft 37 can be arranged not to protrude too much from the floor (step 7b) of the traveling body 1 between the steering wheel 5 and the operator seat, where the operator gets on and off. In other words, it is possible to reduce the projecting height of the transmission shaft 37 from the floor (step 7b) of the traveling body 1.

As seen in plan view, the horizontal shaft 36 is disposed laterally offset from the center line 1b of the traveling body 1 by an appropriate amount L2. In this way, it is possible to prevent the transmission shaft 37 from interfering with the steering wheel shaft 5b while positioning the steering box 5a below the transmission shaft 37. As a result, the floor area around the operator's feet on the traveling body 1 can be sufficiently increased.

Figure 13:
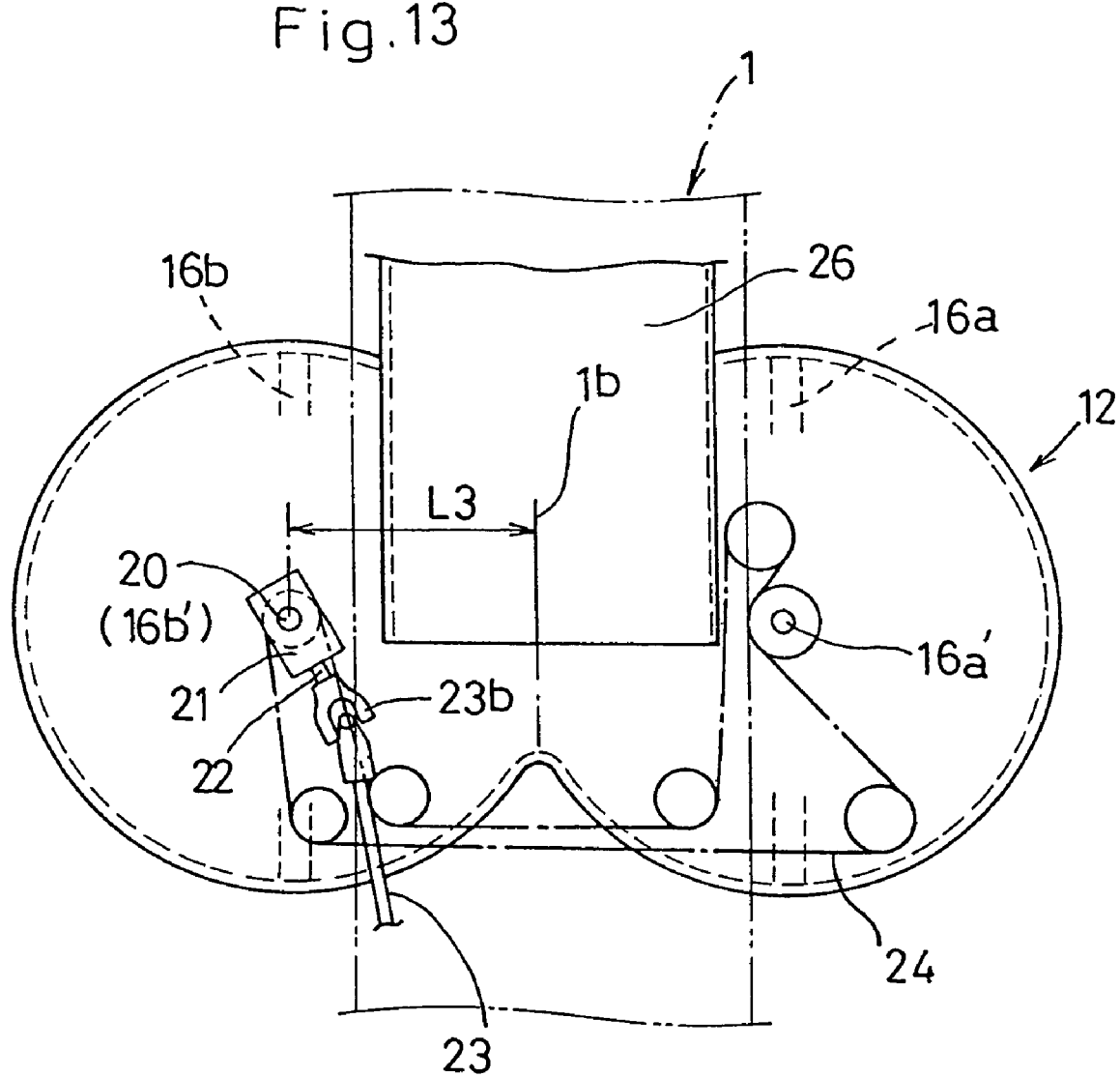
FIG. 13 is a view showing a mower transmission shaft according to another embodiment.

FIG. 13 shows another embodiment of the power transmission for the rotary mowing unit 12. In this embodiment, the traveling body 1 is provided with mowing blades 16a and 16b, and one mowing blade 16b is offset from the center line 1b of the traveling body 1 by an appropriate amount L3. A gear case 21 provided with a vertical shaft 20 and an input shaft 22 is disposed directly on the shaft 16b' of the mowing blade 16b. The vertical shaft 20 is integrated with the shaft 16b' into a single shaft, and the rotation of the shaft 16b' is transmitted to the shaft 16a' of the other mowing blade 16a via an endless belt 24 wound around the shaft 16b'. The resulting structure is advantageously simpler than if the vertical shaft 20 is separate from the shaft 16b'.

The invention claimed is:

1. A running mower comprising:
   a traveling body provided with an engine at the front part and supported by a pair of front wheels and a pair of rear wheels;
   a rotary mowing unit attached to the traveling body between the front wheels and the rear wheels, the mowing unit having a laterally spaced pair of mowing blades oppositely rotating about substantially vertical axes, the mowing unit also including a housing covering the mowing blades; and
   an outlet duct extending backward from upside of the housing between the mowing blades past a position between the rear wheels for discharging grass mown by the mowing blades,
   wherein a mower input shaft is disposed offset from a center between the mowing blades toward one of the mowing blades to extend forwardly above the housing for the rotary mowing unit, engine power being transmitted to the mower input shalt via a mower transmission shaft having a respective end provided with a universal joint;
   wherein the mower transmission shaft has a rear end connected to the mower input shaft, the mower transmission shaft also having a front end connected to the examine via an intermediate shaft; and
   wherein the intermediate shalt is disposed offset from said center between the mowing blades toward said one of the mowing blade by a smaller amount than the mower in put shaft is offset from said center.

2. The running mower according to claim 1, wherein the mower input shaft is inclined forwardly inward in plan view.

3. The running mower according to claim 1, wherein the universal joint at the front end of the mower transmission shaft is positioned offset toward the mower input shaft in plan view.

4. The running mower according to claim 1, wherein the traveling body is provided with an operator seat which has a rear portion provided wit a seat switch mechanism that stops the engine or interrupts the power transmission from the engine to the rear wheels and/or to the rotary mowing unit when the operator gets off the operator seat.

5. A running mower comprising:
a traveling body provided with an engine at the front part and supported by a pair of front wheels and a pair of rear wheels;
a rotary mowing unit attached to the traveling body between the front wheels and the rear wheels, the mowing unit having a laterally spaced pair of mowing blades oppositely rotating about substantially vertical axes, the mowing unit also including a housing covering the mowing blades; and
an outlet duct extending backward from an upside of the housing between the mowing blades past a position between the rear wheels for discharging grass mown by the mowing blades,
wherein a mower input shaft is disposed offset from a center between the mowing blades toward one of the mowing blades to extend forwardly above the housing for the rotary mowing unit, engine power being transmitted to the mower input shaft via a mower transmission shaft having a respective end provided with a universal joint, an upside of the outlet duct being provided with a running transmission for the rear wheels, a running intermediate shaft extending upwardly adjacent to the running transmission, the engine power being transmitted to a lower end of the running intermediate shaft via a running transmission shaft extending substantially horizontally backward from an output shaft of the engine, the engine power being transmitted from an upper end of the intermediate shaft to an input shaft of the running transmission.

6. The running mower according to claim 5, wherein the running intermediate shalt is positioned laterally offset from the output shaft of the engine in plan view, the running transmission shaft which connects the running intermediate shaft and the output shaft being inclined backwardly outward in plan view.

7. The running mower according to claim 5, wherein the running transmission has a pair of end portions fixed to a laterally spaced pair of side frames that form part of the traveling body.

8. The running mower according to claim 5, wherein the mower input shaft is inclined forwardly inward in plan view.

9. The running mower according to claim 5, wherein the universal joint at the front end of the mower transmission shaft is positioned offset toward the mower input shaft in plan view.

10. The running mower according to claim 5, wherein the running intermediate shaft is positioned laterally offset from the output shaft of the engine in plan view, the running transmission shaft which connects the running intermediate shaft and the output shaft being inclined backwardly outward in plan view.

11. The running mower according to claim 5, wherein the traveling body is provided with an operator seat which has a rear portion provided with a seat switch mechanism that stops the engine or interrupts the power transmission from the engine to the rear wheels and/or to the rotary mowing unit when the operator gets off the operator seat.

* * * * *